(12) United States Patent
Chen et al.

(10) Patent No.: US 10,810,437 B2
(45) Date of Patent: Oct. 20, 2020

(54) SECURITY CHECK SYSTEM AND METHOD

(71) Applicant: Nuctech Company Limited, Beijing (CN)

(72) Inventors: Zhiqiang Chen, Beijing (CN); Li Zhang, Beijing (CN); Gang Peng, Beijing (CN); Zhisheng Dai, Beijing (CN); Yunda Sun, Beijing (CN); Dong Li, Beijing (CN)

(73) Assignee: Nuctech Company Limited, Beijing (CN)

( * ) Notice: Subject to any disclaimer, the term of this patent is extended or adjusted under 35 U.S.C. 154(b) by 284 days.

(21) Appl. No.: 15/822,920

(22) Filed: Nov. 27, 2017

(65) Prior Publication Data

US 2018/0173967 A1    Jun. 21, 2018

Related U.S. Application Data

(63) Continuation of application No. PCT/CN2017/109469, filed on Nov. 6, 2017.

(30) Foreign Application Priority Data

Dec. 16, 2016  (CN) .......................... 2016 1 1168867

(51) Int. Cl.
  *G06K 9/00* (2006.01)
  *G06K 9/46* (2006.01)
  (Continued)

(52) U.S. Cl.
  CPC ........... *G06K 9/00771* (2013.01); *G06K 9/46* (2013.01); *G06K 9/78* (2013.01); *G06T 7/0004* (2013.01);
  (Continued)

(58) Field of Classification Search
  CPC ......... G06T 2207/30204; G06T 7/0004; G06T 2207/30232; G06T 2207/30112;
  (Continued)

(56) References Cited

U.S. PATENT DOCUMENTS 5,124,554 A      6/1992  Fowler et al.
2004/0189469 A1*  9/2004 Johnson ............... G01V 5/0008
                                              340/568.1

(Continued)

FOREIGN PATENT DOCUMENTS

CN    104464058 A    3/2015
CN    105549119 A    5/2016
  (Continued)

OTHER PUBLICATIONS

"Australian Application No. 2017261639, Examination Report No. 1 dated Nov. 28, 2018", (dated Nov. 28, 2018), 7 pgs.
  (Continued)

*Primary Examiner* — Shaghayegh Azima
(74) *Attorney, Agent, or Firm* — Schwegman Lundberg & Woessner, P.A.

(57) ABSTRACT

The present disclosure relates to a security check system and method. The present disclosure provides a security check system for identifying objects of interest from multiple objects, comprising: an object-of-interest determining device for determining whether an object is an object of interest; an image mark applying device for acquiring images related to selected objects among the multiple objects and recording image marks of the selected objects; and a mark detecting device for detecting the image marks, wherein the security check system is configured to identify whether the object is the object of interest based on the detection of the mark detecting device and outputs a warning accordingly.

19 Claims, 4 Drawing Sheets

(51) Int. Cl.
*G06K 9/78* (2006.01)
*G06T 7/00* (2017.01)
*G08B 7/06* (2006.01)

(52) U.S. Cl.
CPC ..... *G06K 9/00362* (2013.01); *G06T 2207/30112* (2013.01); *G06T 2207/30204* (2013.01); *G06T 2207/30232* (2013.01); *G08B 7/06* (2013.01)

(58) Field of Classification Search
CPC .. G06K 9/00771; G06K 9/46; G06K 9/00362; G06K 9/78
See application file for complete search history.

(56) References Cited

U.S. PATENT DOCUMENTS

| | | | | |
|---|---|---|---|---|
| 2004/0240542 | A1* | 12/2004 | Yeredor | G06K 9/00771 375/240.01 |
| 2005/0276443 | A1* | 12/2005 | Slamani | G06K 9/00208 382/103 |
| 2007/0024707 | A1* | 2/2007 | Brodsky | H04N 5/232 348/143 |
| 2007/0132580 | A1 | 6/2007 | Ambrefe | |
| 2008/0240578 | A1* | 10/2008 | Gudmundson | G06K 9/00771 382/218 |
| 2008/0253653 | A1* | 10/2008 | Gable | G01V 5/0008 382/173 |
| 2009/0308918 | A1 | 12/2009 | Wilke | |
| 2010/0191367 | A1 | 7/2010 | Grundmann et al. | |
| 2012/0275646 | A1* | 11/2012 | Drouin | G01N 23/046 382/103 |
| 2014/0376686 | A1* | 12/2014 | Dreiseitel | G01V 5/005 378/5 |
| 2015/0022522 | A1* | 1/2015 | Li | G06T 19/00 345/424 |
| 2015/0288928 | A1* | 10/2015 | McCoy | G06K 9/00771 348/143 |
| 2015/0310273 | A1* | 10/2015 | Shreve | G06T 5/005 382/103 |
| 2016/0039436 | A1* | 2/2016 | Bhagwatkar | B61L 23/00 348/148 |
| 2016/0042517 | A1* | 2/2016 | Hunt | G06T 7/246 382/141 |
| 2016/0252646 | A1* | 9/2016 | Sarraiocco | G06K 9/00771 382/103 |
| 2017/0098357 | A1* | 4/2017 | Hoy | G01V 3/00 |

FOREIGN PATENT DOCUMENTS

| | | |
|---|---|---|
| CN | 105631427 A | 6/2016 |
| CN | 105809088 A | 7/2016 |
| CN | 206274349 U | 6/2017 |
| CN | 107037493 A | 8/2017 |
| GB | 2362710 A | 11/2001 |
| JP | 2004069575 A | 3/2004 |
| KR | 20030062167 A | 7/2003 |
| KR | 20130007125 U | 12/2013 |
| RU | 53446 U1 | 5/2006 |
| RU | 2538033 C2 | 1/2015 |
| WO | WO-2008003609 A1 | 1/2008 |
| WO | WO-2015188038 A1 | 12/2015 |

OTHER PUBLICATIONS

"Korean Application No. 10-2017-7034777, Notification of Reason for Refusal dated Nov. 28, 2018", (dated Nov. 28, 2018), 11 pgs.
"Australian Application No. 2017261639, Examination Report No. 2 dated May 16, 2019", 5 pgs.
"Australian Application No. 2017261639, Examination Report No. 3 dated Aug. 7, 2019", 6 pgs.
"Canadian Application Serial No. 2,986,414, Office Action dated Sep. 19, 2019", 4 pgs.
"Korean Application No. 10-2017-7034777, Notice of Final Refusal dated May 10, 2019", (w/ English Translation), 7 pgs.
"Korean Application No. 10-2017-7034777, Notice of Reason for Refusal dated Jun. 20, 2019", (w/ English Translation), 10 pgs.
"Russian Application 2017141635/28(072100), Office Action dated Feb. 10, 2020", (dated Feb. 10, 2020), 7 pgs.
"European Application No. 17797224.7, Extended European Search Report dated Jul. 15, 2020", (Jul. 15, 2020), 27 pgs.

\* cited by examiner

SECURITY CHECK SYSTEM AND METHOD

CROSS-REFERENCE TO RELATED APPLICATIONS

This application is a continuation of PCT Patent Application Serial No. PCT/CN2017/109469 entitled "SECURITY CHECK SYSTEM AND METHOD" filed on Nov. 6, 2017, which in turn claims priority of Chinese Patent Application No. 201611168867.3 filed on Dec. 16, 2016, the disclosures of which are each incorporated by reference in their entireties.

TECHNICAL FIELD

The present disclosure relates to a field of security check of objects, and more particularly to a security check system and method for identifying an object of interest among multiple objects.

BACKGROUND

Generally, arrival objects in airports (e.g., luggage, goods, etc.) will be subjected to security check after being unloaded. Different tags are attached to the objects according to the security check, so that the objects requiring manual check will be identified in an exit detection area through the tags on the objects. However, the tag may intentionally or unintentionally drop out or be removed from the objects during transferring of the objects. For example, a passenger, after fetching his luggage at a baggage reclaim area and before arriving at the exit detection area, may tear off the tag in order to avoid the unsafe objects he carries from being held. Then, without the labels, it may be failed to identify dangerous objects at the exit detection area, which may cause trouble to public safety.

The use of physical tags may increase the cost of security check. For example, at a large airport with 30,000 arrivals per day, the cost of tags reaches up to tens of thousands to hundreds of thousands RMB. Moreover, in order to ensure that tags can be effectively attached to the objects, the printed tags are manually attached to the corresponding objects by operators. Manual attaching of tag needs a large work force and material resources, and this may take a long time for the passengers to pick up their objects after arrival.

Therefore, there is needed a security check system and method that can improve efficiency, reduce costs and screen out objects to be re-inspected reliably.

SUMMARY

An object of the present disclosure is to provide a security check system and method that can use no physical tag. Another object of the present disclosure is to provide a security check system and method that can improve security check efficiency. Another object of the present disclosure is to provide a security check system and method that can prevent miss identification and avoid passengers from knowing they are under suspicion in advance. Another object of the present disclosure is to provide a security check system and method that can reduce labor cost and retrofit cost of infrastructure.

According to an aspect of the disclosure, there is provided a security check system comprising: an object-of-interest determining device for determining whether an object is an object of interest; an image mark applying device for acquiring images related to selected objects among the multiple objects and recording image marks of the selected objects; and a mark detecting device for detecting the image marks, wherein the security check system is configured to identify whether the object is the object of interest based on the detection of the mark detecting device and to output a warning accordingly.

According to embodiments of the disclosure, the selected objects comprise all objects or objects which are determined to be the object of interest, and the security check system is configured to identify whether the object is the object of interest based on the detected image mark and to output a warning if the object is identified as the object of interest based on the image mark.

According to embodiments of the disclosure, the image mark is an image feature of the object and/or an image feature of a person carrying the object.

According to embodiments of the disclosure, the image mark applying device is configured to acquire the image related to the object before the object is fetched by a person and/or when the object is being fetched by a person.

According to embodiments of the disclosure, the image mark applying device is configured to acquire an image of the object and/or an image of the person fetching the object.

According to embodiments of the disclosure, the selected objects among the multiple objects comprise objects which determined not to be the objects of interest, and the mark detecting device is configured to identify the object as the object of interest and output a warning if no recorded image mark is detected.

According to another aspect of the disclosure, there is provided a security check method for identifying objects of interest among multiple objects, comprising: determining whether an object is an object of interest; acquiring images related to selected objects among the multiple objects and recording image marks of the selected objects; and detecting the image marks, identifying whether the object is the object of interest based on the detection, and outputting a warning accordingly.

According to embodiments of the disclosure, the selected objects comprise all objects or objects which are determined to be the object of interest, and it is identified whether the object is the object of interest based on the detected image mark, wherein a warning is outputted if the object is identified as the object of interest based on the image mark.

According to embodiments of the disclosure, the image mark is an image feature of the object and/or an image feature of a person carrying the object.

According to embodiments of the disclosure, the image related to the object is acquired before the object is fetched by a person and/or when the object is being fetched by a person.

According to embodiments of the disclosure, the step of acquiring the image related to the object comprises acquiring an image of the object and/or an image of the person fetching the object.

According to embodiments of the disclosure, the selected objects among the multiple objects comprise objects which are determined not to be the objects of interest, and the object is identified as the object of interest and a warning is outputted if no recorded image mark is detected.

DETAILED DESCRIPTION

Below, embodiments of the present disclosure will be described with reference to the drawings. The detailed description and drawings are used to illustrate the principles of the present disclosure. The present disclosure is not limited to the described preferred embodiments, and the scope of the present disclosure is defined by the claims.

Figure 1:
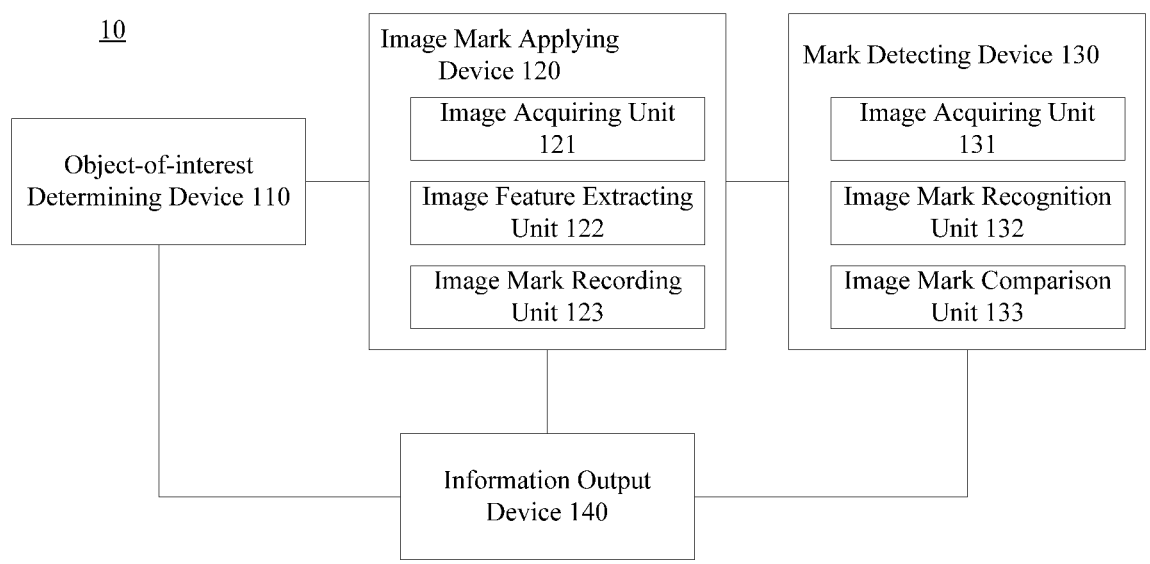
FIG. 1 is a schematic diagram of a security check system according to some embodiments of the present disclosure.

FIG. 1 is a schematic diagram of a security check system according to an embodiment of the present disclosure. As shown in FIG. 1, the security check system 10 comprises an object-of-interest determining device 110, an image mark applying device 120 and a mark detecting device 130.

The object-of-interest determining device 110 can determine whether an object is an object of interest. According to embodiments of the present disclosure, the object of interest may comprise a suspected object, such as a piece of suspected luggage. In an exemplary embodiment, the object-of-interest determining device 110 can check arrival luggage at an airport for security to determine whether the luggage is a piece of suspected luggage. In some embodiments, the object-of-interest determining device 110 may scan objects to acquire scanned images of the objects, identify and analyze the scanned images of the objects, and determine whether the luggage is a piece of suspected luggage based on the analysis. In some embodiments, the object-of-interest determining device 110 may scan luggage while the luggage is being transported on a conveyor. In some embodiments, the object-of-interest determining device 110 may comprise an X-ray scanning unit for scanning each piece of luggage to acquire scanned images. In some embodiments, the object-of-interest determining device 110 may analyze the scanned images locally or remotely in an automatic or manual manner to determine whether the luggage is suspected luggage. In some embodiments, the object-of-interest determining device 110 may identify information related to the luggage or read it from outside, such as information of a passenger who owns the luggage.

The image mark applying device 120 can acquire images related to selected objects among multiple objects and record image marks of the selected objects. The image mark applying device 120 can communicate with the object-of-interest determining device 110 via wire or wirelessly. In some embodiments, the image mark applying device 120 may receive information related to the objects from the object-of-interest determining device 110, such as information of a passenger who owns the luggage, information of security check image, information about whether the luggage is suspected luggage and the like.

In an exemplary embodiment, the image mark applying device 120 can comprise an image acquiring unit 121, an image feature extracting unit 122, and an image mark recording unit 123.

The image acquiring unit 121 can acquire images related to selected luggage among multiple pieces of luggage. In some embodiments, the image acquiring unit 121 can be controlled to acquire images of all pieces of luggage. In some embodiments, the image acquiring unit 121 can be controlled to acquire an image of suspected luggage. In some embodiments, the image acquiring unit 121 can be controlled to acquire images of unsuspected luggage.

According to an embodiment of the present disclosure, the image acquiring unit 121 can acquire an image of luggage and/or an image of a person carrying the luggage. In some embodiments, the image acquiring unit 121 can be configured to acquire the image related to the luggage before the luggage is fetched. For example, the image acquiring unit 121 can be configured to acquire the image of the luggage before the object-of-interest determining device 110 determines whether the luggage is suspected luggage. For example, the image acquiring unit 121 can be configured to acquire images of all luggage, suspected luggage, or unsuspected luggage after the object-of-interest determining device 110 determines whether the luggage is suspected luggage.

In some embodiments, the image acquiring unit 121 can be configured to acquire the image related to the luggage when the luggage is being fetched. In some embodiments, the image acquiring unit 121 can be configured to acquire, with respect to all luggage, suspected luggage or unsuspected luggage, images of luggage and/or passengers fetching them after the object-of-interest determining device 110 determines whether the luggage is suspected luggage and when the luggage is being fetched.

According to an embodiment of the present disclosure, the image acquiring unit 121 can acquire a visible image, an infrared image, a depth image and the like related to the luggage. In some embodiments, the image acquiring unit 121 can comprise a visible light camera, an infrared camera, a depth image sensor and the like.

The image feature extracting unit 122 can extract an image feature of the luggage and/or an image feature of the person carrying the luggage from the image acquired by the image acquiring unit 121. In some embodiments, the image feature extracting unit 122 can be controlled to extract image features of all luggage. In some embodiments, the image feature extracting unit 122 can be controlled to extract image features of suspected luggage. In some embodiments, the image feature extracting unit 122 can be controlled to extract image features of unsuspected luggage.

According to an embodiment of the present disclosure, the image feature extracting unit 122 can extract the image feature of the luggage and/or the image feature of the person by various image recognition technologies. In some embodiments, the image feature of the luggage comprises but is not limited to: shape, size, color, texture, material and the like of the luggage. In some embodiments, the image feature of the person comprises but is not limited to: facial feature, body type, dressing, hair style, height and the like of the person.

The image mark recording unit 123 can record an image mark of the luggage based on the image feature extracted by the image feature extracting unit 122. In an exemplary embodiment, the image mark recording unit 123 may select one or more image features from the image features extracted by the image feature extracting unit 122 as the image mark of the luggage.

The mark detecting device 130 can detect the image mark. The mark detecting device 130 can communicate with the object-of-interest determining device 110 and/or the image mark applying device 120 via wire or wirelessly. In some embodiments, the mark detecting device 130 can receive information related to the object from the object-of-interest determining device 110, such as information of the passenger who owns the luggage, information of the security check image, information about whether the luggage is suspected luggage and the like. In some embodiments, the mark detecting device 130 can receive information related to the luggage image from the image mark applying device 120, such as the image feature of the luggage, the image feature of the person carrying the luggage, the image mark of the luggage and the like.

In an exemplary embodiment, the mark detecting device 130 can comprise an image acquiring unit 131, an image mark recognition unit 132 and an image mark comparison unit 133.

The image acquiring unit 131 can acquire the image related to the luggage. According to an embodiment of the present disclosure, the image acquiring unit 131 can acquire the image of the luggage and/or the person carrying the luggage. In some embodiments, the image acquiring unit 131 may acquire the image according to the image (the image of the luggage, the image of the person carrying the luggage or both) acquired by the image mark applying device 120 (for example, the image acquiring unit 121).

According to an embodiment of the present disclosure, the image acquiring unit 131 may acquire the image of the luggage and/or the image of the person carrying the luggage one or more times, for example, at one or more positions. In some embodiments, the image acquiring unit 131 may be configured to acquire the image of the luggage and/or the image of the person carrying the luggage before the luggage is about to leave from an exit of a security check area, for example, a passenger exit of an airport. In some embodiments, the image acquiring unit 131 may be configured to acquire the image of the luggage and/or the person carrying the luggage after the image mark applying device 120 acquires the image related to the luggage or records the image mark of the luggage.

According to an embodiment of the present disclosure, the image acquiring unit 131 may acquire a visible image, an infrared image, a depth image and the like related to the luggage. In some embodiments, the image acquiring unit 131 may comprise a visible light camera, an infrared camera, a depth image sensor and the like.

The image mark recognition unit 132 can recognize the image mark of the luggage from the image acquired by the image acquiring unit 131.

In an exemplary embodiment, the image mark recognition unit 132 may extract the image feature of the luggage and/or the image feature of the person carrying the luggage from the acquired image, and then recognize the image mark of the luggage based on the extracted image feature. In some embodiments, the image mark recognition unit 132 may extract the corresponding image feature from the image acquired by the image acquiring unit 131 according to the image feature extracted by the image feature extracting unit 122. According to an embodiment of the present disclosure, the image acquiring unit 131 may extract the image feature of the luggage and/or the image feature of the person by various image recognition technologies.

The image mark comparison unit 133 can compare the recognized image mark of the luggage with the image mark of the luggage recorded by the image mark applying device 120 (for example, the image mark recording unit 123) to determine whether the luggage is suspected luggage.

According to an embodiment of the present disclosure, the security check system 10 may further comprise an information output device 140. The information output device 140 can communicate with the object-of-interest determining device 110, the image mark applying device 120 and/or the mark detecting device 130 via wire or wirelessly. In some embodiments, the information output device 140 may receive information related to the object from the object-of-interest determining device 110, such as information of the passenger who owns the luggage, information of the security check image, information about whether the luggage is suspected luggage and the like. In some embodiments, the information output device 140 may receive information related to the luggage image from the image mark applying device 120, such as the image of the luggage, the image feature of the luggage, the image of the person carrying the luggage, the image feature of the person carrying the luggage, the image mark of the luggage and the like. In some embodiments, the information output device 140 may receive information related to the object from the mark detecting device 130, such as the image of the luggage, the image of the person carrying the luggage, the image mark of the luggage and information about whether the luggage is suspected luggage.

In an exemplary embodiment, if the mark detecting device 130 identifies that the luggage is suspected luggage, the information output device 140 can output a warning, such as visual warning, acoustic warning and tactile warning. An operator may manually inspect the suspected luggage with the approval of the passenger according to the warning. In some embodiments, the information output device 140 can display the security check image, the image of the luggage, the image of the person carrying the luggage and the like.

The security check system according to the present disclosure can identify the suspected luggage among numerous pieces of luggage such that it is possible to avoid unsafe objects from being allowed through and thus ensure national and public safety. Moreover, the security check system according to the present disclosure can identify the suspected luggage without physical tag, thus preventing miss identification of the suspected luggage and avoiding the passenger from knowing he is under suspicion in advance.

Figure 2:
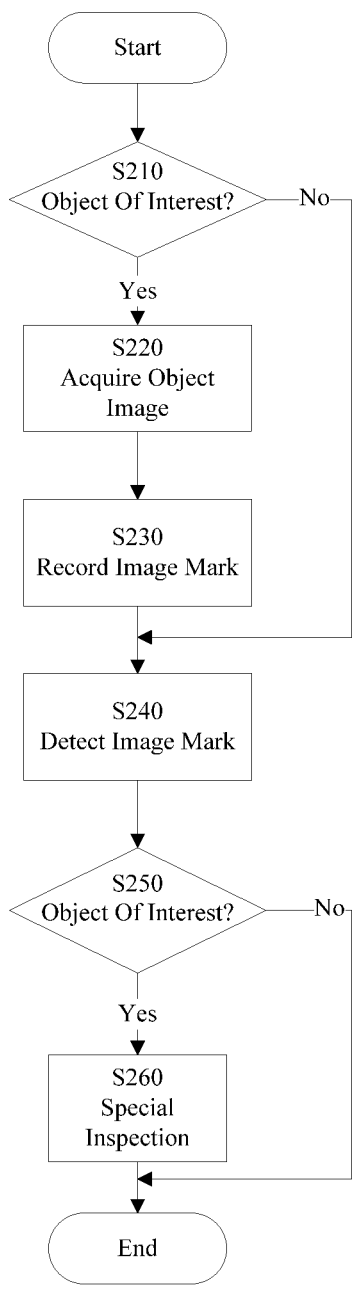
FIG. 2 is a flow chart of a security check method according to some embodiments of the present disclosure.

Below, a security check method according to an embodiment of the present disclosure will be described with reference to the drawings. FIG. 2 is a flow chart of a security check method according to an embodiment of the present disclosure.

As shown in FIG. 2, at step S210, it is determined whether an object is an object of interest. According to an embodiment of the present disclosure, the object of interest may comprise a suspected object, such as suspected luggage. In an exemplary embodiment, at step S210, it is determined whether a piece of luggage is suspected luggage. In some embodiments, the object may be scanned to acquire a scanned image of the object, the scanned image of the object is identified and analyzed, and it is determined whether the luggage is suspected target luggage based on the analysis. In some embodiments, the luggage may be scanned while it is being transported on a conveyor. In some embodiments, each piece of luggage may be scanned with X-rays to acquire scanned images. In some embodiments, the scanned image may be analyzed locally or remotely in an automatic or manual manner to determine whether the luggage is suspected luggage. In some embodiments, information related to the luggage may be identified or read from outside, such as information of the passenger who owns the luggage.

If it is determined the object is not the object of interest at step S210, the method proceeds to step S240. If it is determined the object is the object of interest at step S210, the method proceeds to step S220.

At step S220, an image related to the object of interest (for example, suspected luggage) is acquired. According to an embodiment of the present disclosure, an image of the luggage and/or an image of a person carrying the luggage may be acquired. In some embodiments, an image related to the luggage may be acquired before the luggage is fetched.

For example, the image of the luggage may be acquired when the luggage is determined to be suspected luggage. In some embodiments, the image related to the luggage may be acquired when the luggage is being fetched by a person. For example, the image of the luggage and/or the image of the person fetching the luggage may be acquired after the luggage is determined to be suspected luggage and when the luggage is being fetched by the person. According to an embodiment of the present disclosure, a visible image, an infrared image, a depth image and the like related to the luggage may be acquired.

At step S230, an image mark of the object (for example, luggage) is recorded. In an exemplary embodiment, an image feature of the luggage and/or an image feature of the person carrying the luggage may be extracted from the acquired image. According to an embodiment of the present disclosure, the image feature of the luggage and/or the image feature of the person may be extracted by various image recognition technologies. In some embodiments, the image mark of the luggage may be recorded based on the extracted image feature. In an exemplary embodiment, one or more image features may be selected from the extracted image features as the image mark of the luggage.

At step S240, the image mark of the object (for example, luggage) is detected. In some embodiments, the image related to the luggage may be acquired again, such as the image of the luggage and/or the image of the person carrying the luggage. In some embodiments, the image of the luggage and/or the image of the person carrying the luggage may be acquired one or more times, such as at one or more positions. In some embodiments, the image of the luggage and/or the image of the person carrying the luggage may be acquired when the luggage is about to leave an exit of a security checking area, such as a passenger exit of an airport.

In an exemplary embodiment, the image mark of the luggage may be recognized from the re-acquired image. In some embodiments, the image feature of the luggage and/or the image feature of the person carrying the luggage may be extracted from the re-acquired image, and the image mark of the luggage may be recognized based on the extracted image feature. According to an embodiment of the present disclosure, the image feature of the luggage and/or the image feature of the person may be extracted by various image recognition technologies.

At step S250, it is determined whether the object is the object of interest (for example, it is determined whether the luggage is suspected luggage) based on the recognized image mark. In an exemplary embodiment, the recognized image mark of the luggage may be compared with the recorded image mark of the luggage such that it is determined whether the luggage is suspected luggage.

If it is determined the object is not the object of interest at step S250, the method ends. In this case, for example, the luggage may be allowed through. If it is determined the object is the object of interest at step S250, the method proceeds to step S260.

At step S260, a special inspection is performed on the object of interest (for example, suspected luggage). In an exemplary embodiment, an operator may manually inspect the suspected luggage with the approval of the passenger.

In the embodiment shown in FIG. 2, only the image mark of the object of interest is recorded. For example, only the image mark of the suspected luggage is recorded. In this case, the suspected luggage may be identified based on the detected image mark and thus the special inspection is performed on the suspected luggage, such as manual inspection of luggage.

The security check method as described above identifies the object of interest based on the image mark and performs the special inspection on the object of interest. However, the present disclosure is not limited this. The security check method according to the present disclosure may also identify an object of non-interest based on the image mark and perform the special inspection on the object of non-interest. In this case, the object of non-interest may refer to suspected luggage. For example, if the object is determined to be the object of interest at step S250, the object (for example, luggage) may be allowed through. If the object is determined to be the object of non-interest at step S250, the special inspection will be performed on the object of non-interest at step S260.

Figure 3:
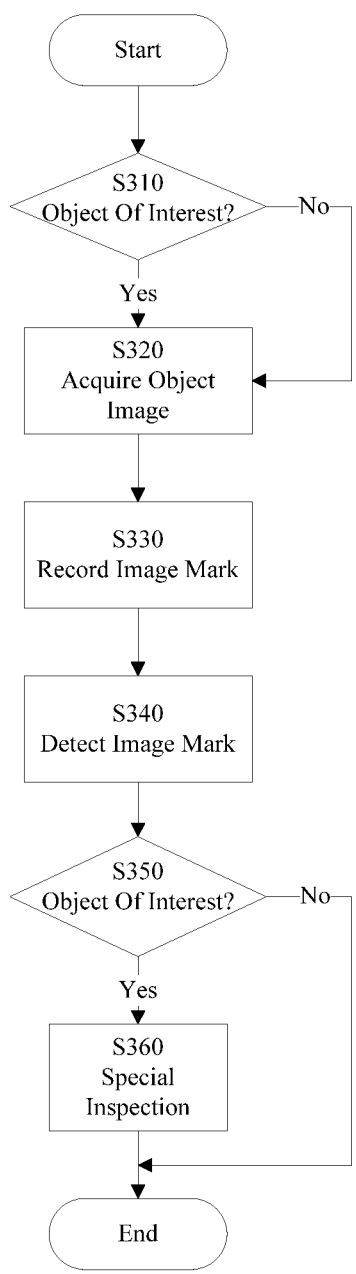
FIG. 3 is a flow chart of a security check method according to some embodiments of the present disclosure.

Below, a security check method according to an embodiment of the present disclosure will be described with reference to the drawings. FIG. 3 shows a flow chart of the security check method according to an embodiment of the present disclosure.

As shown in FIG. 3, at step S310, it is determined whether an object is an object of interest. For example, it is determined whether a piece of luggage is suspected luggage. The particular determination process refers to the above description and will not be explained here.

If it is determined the object is the object of interest at step S310, the method proceeds to step S320. If it is determined the object is not the object of interest at step S310, the method also proceeds to step S320.

The operations executed in steps S320-S360 of the security check method of FIG. 3 are similar as the operations executed in steps S220-S260 described above with reference to FIG. 2 and will not be explained here.

Figure 4:
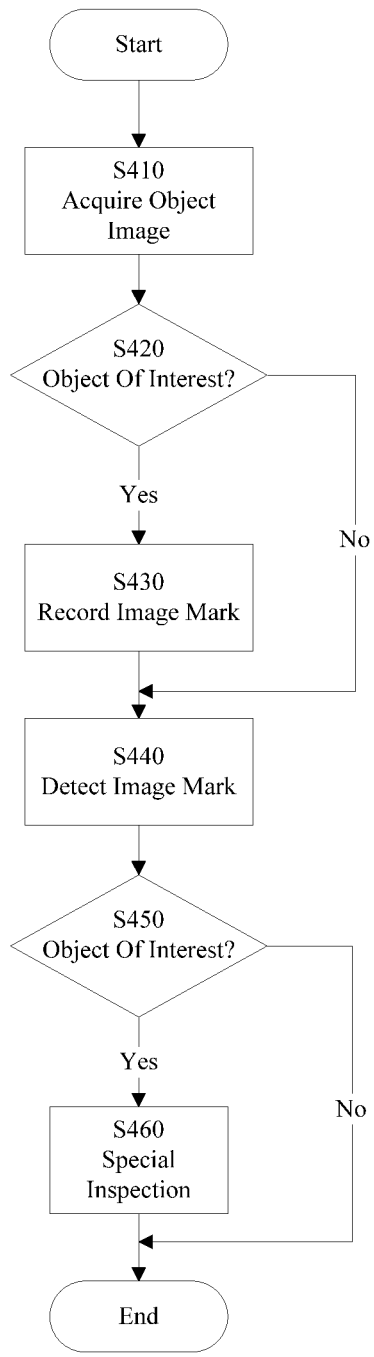
FIG. 4 is a flow chart of a security check method according to some embodiments of the present disclosure.

Below, a security check method according to an embodiment of the present disclosure will be described with reference to the drawings. FIG. 4 shows a flow chart of the security check method according to an embodiment of the present disclosure.

As shown in FIG. 4, at step S410, images related to all objects (for example, all luggage) are acquired. According to an embodiment of the present disclosure, an image of the luggage and/or an image of a person carrying the luggage may be acquired. According to an embodiment of the present disclosure, a visible image, an infrared image, a depth image and the like related to the luggage may be acquired.

At step S420, it is determined whether the object is an object of interest. For example, it is determined whether the luggage is suspected luggage. The particular determination process refers to the above description and will not be explained here.

If it is determined the object is the object of interest at step S420, the method proceeds to step S430. If it is determined the object is not the object of interest at step S420, the method proceeds to step S440.

The operations executed in steps S430-S460 of the security check method of FIG. 4 are similar as the operations executed in steps S230-S260 described above with reference to FIG. 2 and will not be explained here.

In the embodiment shown in FIG. 4, the images of all objects may be acquired, but only the image mark of the object of interest is recorded. For example, only the image mark of the suspected luggage is recorded. In this case, the image marks of all objects may be detected, and if the recorded image mark is detected from a certain object, it indicates that the object is the object of interest.

It is described above that the image marks of suspected luggage or all luggage are recorded. However, the present disclosure is not limited this. The security check system and method according to the present disclosure may also record the image marks of unsuspected luggage. In this case, if the recorded image mark is not detected from a certain luggage such as at the exit, it is determined that the luggage is suspected luggage.

The above embodiments of the present disclosure are described with reference to arrival luggage at airport. However, the present disclosure is not limited this. The security check system and method according to the present disclosure may also be applied in security check of other objects (for example, goods) at other places (such as at a port, at a station, in logistics industry and the like).

Although the present disclosure is described with reference to the exemplary embodiments, it should be appreciated that the present disclosure is not limited to the constructions and methods described above. On the contrary, the present disclosure is intended to cover various modified embodiments and equivalent configurations. In addition, although various elements and various method steps of the present disclosure are shown in various exemplary combinations and constructions, other combinations including more or less elements or method steps should also fall into the scope of the present disclosure.

What is claimed is:

1. A security check system for identifying objects of interest from multiple objects without physical mark, comprising at least a processor operating in conjunction with a memory and a plurality of devices, the devices comprise:
    an object-of-interest determining device for determining whether an object is an object of interest based on X-ray scanned images of the object, wherein the object is luggage;
    an image mark applying device for acquiring visible, infrared or depth images related to selected objects among the multiple objects through a first camera after the object-of-interest determining device has determined whether the object is the object of interest and recording image marks of the selected objects from the images acquired by the first camera; and
    a mark detecting device for acquiring visible, infrared or depth images related to the selected objects through a second camera after the image mark applying device acquires the images related to the selected objects and detecting the image marks from the images acquired by the second camera,
    wherein the security check system is configured to identify whether the object is the object of interest based only on the detection of the mark detecting device, without detecting any physical mark, and to output a warning accordingly.

2. The security check system according to claim 1, wherein
    the selected objects comprise at least one of: all objects and objects which are determined to be the objects of interest, and
    the security check system is configured to identify whether the object is the object of interest based on the detected image mark and to output a warning if the object is identified as the object of interest based on the image mark.

3. The security check system according to claim 1, wherein
    the image mark is an image feature of the object.

4. The security check system according to claim 1, wherein
    the image mark is an image feature of a person carrying the object.

5. The security check system according to claim 1, wherein
    the image mark applying device is configured to acquire the image related to the object before the object is fetched by a person.

6. The security check system according to claim 1, wherein
    the image mark applying device is configured to acquire the image related to the object when the object is being fetched by a person.

7. The security check system according to claim 5, wherein
    the image mark applying device is configured to acquire at least one of an object image of the object and a person image of the person fetching the object.

8. The security check system according to claim 6, wherein
    the image mark applying device is configured to acquire at least one of an object image of the object and a person image of the person fetching the object.

9. The security check system according to claim 1, wherein
    the selected objects among the multiple objects comprise objects which are determined not to be the objects of interest, and
    the mark detecting device is configured to identify the object as the object of interest and output a warning if no recorded image mark is detected.

10. A security check method for identifying objects of interest among multiple objects without physical mark, comprising:
    determining whether an object is an object of interest based on X-ray scanned images of the object which are acquired through X-ray scanning, wherein the object is luggage;
    acquiring visible, infrared or depth images related to selected objects among the multiple objects through a first camera after it is determined whether the object is the object of interest and recording image marks of the selected objects from the images acquired by the first camera; and
    acquiring visible, infrared or depth images related to the selected objects through a second camera and detecting the image marks from the images acquired by the second camera, identifying whether the object is the object of interest based only on the detection of the image mark, without detecting any physical mark, and outputting a warning accordingly.

11. The security check method according to claim 10, wherein
    the selected objects comprise at least one of: all objects and objects which are determined to be the objects of interest, and
    it is identified whether the object is the object of interest based on the detected image mark, and wherein a warning is outputted if the object is identified as the object of interest based on the image mark.

12. The security check method according to claim 10, wherein
    the image mark is an image feature of the object.

13. The security check method according to claim 10, wherein
    the image mark is an image feature of a person carrying the object.

14. The security check method according to claim 10, wherein the image related to the object is acquired before the object is fetched by a person.

15. The security check method according to claim 10, wherein
the image related to the object is acquired when the object is being fetched by a person.

16. The security check method according to claim 14, wherein
the step of acquiring the image related to the object comprises acquiring at least one of an image of the object and an image of the person fetching the object.

17. The security check method according to claim 15, wherein
the step of acquiring the image related to the object comprises acquiring at least one of an image of the object and an image of the person fetching the object.

18. The security check method according to claim 10, wherein
the selected objects among the multiple objects comprise objects which are determined not to be the objects of interest, and
the object is identified as the object of interest and a warning is outputted if no recorded image mark is detected.

19. A security check system for identifying objects of interest from multiple objects, comprising:
a processor; and
a memory for storing instructions executable by the processor,
wherein the processor is configured to:
determine whether an object is an object of interest based on X-ray scanned images of the object which are acquired through X-ray scanning, wherein the object is luggage;
acquire visible, infrared or depth images related to selected objects among the multiple objects through a first camera after it is determined whether the object is the object of interest and record image marks of the selected objects from the images acquired by the first camera; and
acquire visible, infrared or depth images related to the selected objects through a second camera and detect the image marks from the images acquired by the second camera; and
identify whether the object is the object of interest based only on the detection of the image mark, without detecting any physical mark, and output a warning accordingly.

* * * * *